US009302940B2

(12) United States Patent
Bullerjahn et al.

(10) Patent No.: US 9,302,940 B2
(45) Date of Patent: *Apr. 5, 2016

(54) TERNESITE USED AS AN ACTIVATOR FOR LATENT-HYDRAULIC AND POZZOLANIC MATERIALS

(75) Inventors: Frank Bullerjahn, Leimen (DE); Dirk Schmitt, Leimen (DE); Mohsen Ben Haha, Heidelberg (DE); Barbara Batog, Jablonka (PL); Linda Irbe, Heppenheim (DE)

(73) Assignee: HEIDELBERGCEMENT AG, Heidelberg (DE)

( * ) Notice: Subject to any disclaimer, the term of this patent is extended or adjusted under 35 U.S.C. 154(b) by 0 days.

This patent is subject to a terminal disclaimer.

(21) Appl. No.: 14/238,947

(22) PCT Filed: Jul. 16, 2012

(86) PCT No.: PCT/EP2012/002979
§ 371 (c)(1),
(2), (4) Date: May 23, 2014

(87) PCT Pub. No.: WO2013/023732
PCT Pub. Date: Feb. 21, 2013

(65) Prior Publication Data
US 2014/0261088 A1 Sep. 18, 2014

(30) Foreign Application Priority Data

| Aug. 18, 2011 | (EP) | 11006757 |
| Oct. 26, 2011 | (EP) | 11008570 |
| Mar. 5, 2012 | (EP) | 12001488 |
| Mar. 26, 2012 | (EP) | 12002111 |
| Mar. 30, 2012 | (EP) | 12002342 |
| May 10, 2012 | (EP) | 12003718 |

(51) Int. Cl.
*C04B 7/13* (2006.01)
*C04B 7/153* (2006.01)
*C04B 7/24* (2006.01)
*C04B 7/345* (2006.01)
*C04B 28/08* (2006.01)
*C04B 28/04* (2006.01)
*C04B 28/06* (2006.01)
*C04B 7/32* (2006.01)
*C04B 40/00* (2006.01)
*C04B 28/02* (2006.01)
*C04B 22/00* (2006.01)
*C04B 22/14* (2006.01)
*C04B 7/02* (2006.01)
*C04B 7/26* (2006.01)
*C04B 7/28* (2006.01)
*C04B 16/04* (2006.01)
*C04B 103/14* (2006.01)
*C04B 111/00* (2006.01)

(52) U.S. Cl.
CPC ............... *C04B 7/3453* (2013.01); *C04B 7/02* (2013.01); *C04B 7/26* (2013.01); *C04B 7/28* (2013.01); *C04B 7/323* (2013.01); *C04B 7/326* (2013.01); *C04B 7/345* (2013.01); *C04B 16/04* (2013.01); *C04B 22/0093* (2013.01); *C04B 22/14* (2013.01); *C04B 28/02* (2013.01); *C04B 28/021* (2013.01); *C04B 28/04* (2013.01); *C04B 28/065* (2013.01); *C04B 28/08* (2013.01); *C04B 40/0039* (2013.01); *C04B 2103/14* (2013.01); *C04B 2111/00017* (2013.01); *C04B 2111/00767* (2013.01); *Y02W 30/91* (2015.05)

(58) Field of Classification Search
CPC ...... C04B 7/3453; C04B 7/345; C04B 7/326; C04B 7/323; C04B 7/02; C04B 7/26; C04B 7/28; C04B 14/106; C04B 14/303; C04B 16/04; C04B 22/06; C04B 22/085; C04B 22/10; C04B 22/14; C04B 22/124; C04B 22/148; C04B 22/0093; C04B 24/045; C04B 28/02; C04B 28/021; C04B 28/04; C04B 28/065; C04B 28/08; C04B 40/0039; C04B 2103/14; C04B 2111/00017; C04B 2111/00767
USPC .......................................... 106/643, 706, 789
See application file for complete search history.

(56) References Cited

U.S. PATENT DOCUMENTS

| 6,113,684 A | 9/2000 | Kunbargi | |
| 6,406,534 B1* | 6/2002 | Kunbargi | 106/692 |
| 6,758,896 B2* | 7/2004 | Kunbargi | 106/692 |
| 7,150,786 B2* | 12/2006 | Kunbargi | 106/692 |
| 8,153,552 B2 | 4/2012 | Cau Dit Coumes et al. | |

(Continued)

FOREIGN PATENT DOCUMENTS

| AT | 393 381 B | 10/1991 |
| CN | 1479700 A | 3/2004 |

(Continued)

OTHER PUBLICATIONS

Belz et al., "Synthesis of Special Cements from Mixtures Containing Fluidized Bed Combustion Waste, Calcium Carbonate and Various Sources of Alumina", 28th Meeting of the Italian Section of the Combustion Institute (2005), pp. I-4-1-I-4-6.

(Continued)

*Primary Examiner* — Anthony J Green
(74) *Attorney, Agent, or Firm* — Paul D. Strain, Esq.; Strain & Strain PLLC

(57) ABSTRACT

The present invention relates to binders based on latently hydraulic and/or pozzolanic materials that are activated by an addition of ternesite ($C_5S_2\$$).

27 Claims, 4 Drawing Sheets

(56) References Cited

U.S. PATENT DOCUMENTS

| | | | |
|---|---|---|---|
| 8,557,039 B2 | 10/2013 | Jacob et al. | |
| 8,574,359 B2 * | 11/2013 | Marchi et al. | 106/693 |
| 2002/0164485 A1 | 11/2002 | Martin | |
| 2004/0101672 A1 | 5/2004 | Anton et al. | |
| 2011/0308431 A1 | 12/2011 | Pasquier et al. | |
| 2012/0085265 A1 | 4/2012 | Walenta et al. | |
| 2013/0118384 A1 | 5/2013 | Barnes-Davin et al. | |
| 2014/0230696 A1 | 8/2014 | Bullerjahn et al. | |
| 2014/0230697 A1 | 8/2014 | Bullerjahn et al. | |
| 2014/0230699 A1 | 8/2014 | Bullerjahn et al. | |
| 2014/0238274 A1 | 8/2014 | Bullerjahn et al. | |
| 2014/0283712 A1 | 9/2014 | Bullerjahn et al. | |

FOREIGN PATENT DOCUMENTS

| | | |
|---|---|---|
| CN | 101952216 A | 1/2011 |
| DE | 21 22 710 A1 | 11/1971 |
| DE | 37 01 717 C1 | 4/1988 |
| DE | 196 44 654 A1 | 4/1998 |
| DE | 198 43 092 A1 | 11/1999 |
| DE | 600 29 770 T2 | 8/2007 |
| DE | 10 2005 054 190 B3 | 10/2007 |
| EP | 0 397 963 A1 | 11/1990 |
| EP | 0 838 443 A1 | 4/1998 |
| EP | 0 858 981 A1 | 8/1998 |
| EP | 0 959 053 A1 | 11/1999 |
| EP | 1 171 398 B1 | 8/2006 |
| EP | 2 159 202 A1 | 3/2010 |
| EP | 2 559 674 A1 | 2/2013 |
| FR | 2 901 270 A1 | 11/2007 |
| FR | 2 928 643 A1 | 9/2009 |
| FR | 2 946 978 A1 | 12/2010 |
| JP | 9-268037 A | 10/1997 |
| JP | 2001-130945 A | 5/2001 |
| UA | 83 570 C2 | 7/2008 |
| UA | 64 565 U | 11/2011 |
| WO | WO 98/18740 A1 | 5/1998 |
| WO | WO 2005/097700 A2 | 10/2005 |
| WO | WO 2012/055517 A1 | 5/2012 |
| WO | WO 2013/023727 A2 | 2/2013 |
| WO | WO 2013/023728 A2 | 2/2013 |
| WO | WO 2013/023729 A2 | 2/2013 |
| WO | WO 2013/023730 A2 | 2/2013 |
| WO | WO 2013/023731 A2 | 2/2013 |

OTHER PUBLICATIONS

Belz et al., "Fluidized Bed Combustion Waste as a Raw Mix Component for the Manufacture of Calcium Sulphoaluminate Cements", 29th Meeting of the Italian Section of the Combustion Institute (2006), pp. IX4.1-IX4.5.
English translation of International Preliminary Report on Patentability, PCT/EP2012/002974, Feb. 20, 2014.
English translation of International Preliminary Report on Patentability, PCT/EP2012/002975, Feb. 20, 2014.
English translation of International Preliminary Report on Patentability, PCT/EP2012/002976, Feb. 20, 2014.
English translation of International Preliminary Report on Patentability, PCT/EP2012/002977, Feb. 27, 2014.
English translation of International Preliminary Report on Patentability, PCT/EP2012/002978, Feb. 20, 2014.
English translation of International Preliminary Report on Patentability, PCT/EP2012/002979, Feb. 27, 2014.
Jewell et al., "The Fabrication of Value Added Cement Products from Circulating Fluidized Bed Combustion Ash", 2007 World of Coal Ash (WOCA), May 7-10, 2007, Northern Kentucky, USA, 11 pgs.
Kapralik et al., "Phase Changes in the System CaO—Al2O3—SiO2—Fe2O3—MgO—CaSO4—K2SO4 in Ar up to 1300° C referred to Sulphoaluminate Cement Clinker", Br. Ceram. Trans. J., vol. 85 (1986), pp. 131-136.
Sahu et al., "Phase compatibility in the system CaO—SiO2—Al2O3—Fe2O3—SO3 referred to sulphoaluminate belite cement clinker", Cement and Concrete Research, vol. 23 (1993), pp. 1331-1339.
Bullerjahn, U.S. PTO Office Action, U.S. Appl. No. 14/239,319, Jun. 26, 2014, 18 pgs.
Bullerjahn, U.S. PTO Office Action, U.S. Appl. No. 14/239,339, Jun. 27, 2014, 16 pgs.
Beretka et al. "Synthesis and Properties of Low Energy Cements based on C4A3S", 9th International Congress on the Chemistry of Cement (1992), pp. 195-200.
Beretka et al., "Utilisation of industrial wastes and by-products for the synthesis of special cements", Resources, Conservation and Recycling, vol. 9 (1993), pp. 179-190.
Bullerjahn, U.S. PTO Office Action, U.S. Appl. No. 14/238,872, Jul. 21, 2014, 14 pgs.
Bullerjahn, U.S. PTO Office Action, U.S. Appl. No. 14/239,348, Jun. 30, 2014, 15 pgs.
Calos et al., Structure of Calcium Aluminate Sulfate Ca4Al6O16S, Journal of Solid State Chemistry, vol. 119 (1995), pp. 1-7.
Schmidt et al. "Quantification of Calcium Sulpho-Aluminate Cement by Rietveld Analysis", Materials Science Forum, vols. 321-324 (2000), pp. 1022-1027.
Belz et al., "Use of Fly Ash, Blast Furnace Slag, and Chemical Gysum for the Synthesis of Calcium Sulfoaluminate-Based Cements", Fly Ash, Silica Fume, Slag and Natural Pozzolans in Concrete. Proceedings International Conference, vol. 1, No. SP-153 (1995), pp. 513-530, XP001011491.
Beretka et al,. "The Influence of $C_4A_3S$ Content and W/S Ratio on the Performance of Calcium Sulfoaluminate-based Cements", Cement and Concrete Research, vol. 26, No. 11 (1996), pp. 1673-1681.
European Search Report, Appl. No. 11006757.6, Jan. 25, 2012, 9 pgs.
European Search Report, Appl. No. 12001488.1, Jun. 27, 2012, 13 pgs.
European Search Report, Appl. No. 12002111.8, Jun. 27, 2012, 15 pgs.
European Search Report, Appl. No. 12002342.9, Jul. 25, 2012, 13 pgs.
European Search Report, Appl. No. 12003718.9, Oct. 11, 2012, 14 pgs.
International Search Report, PCT/EP2012/002974, Feb. 8, 2013, 3 pgs.
International Search Report, PCT/EP2012/002975, Feb. 8, 2013, 4 pgs.
International Search Report, PCT/EP2012/002976, Feb. 8, 2013, 4 pgs.
International Search Report, PCT/EP2012/002977, Feb. 8, 2013, 3 pgs.
International Search Report, PCT/EP2012/002978, Feb. 8, 2013, 2 pgs.
International Search Report, PCT/EP2012/002979, Feb. 8, 2013, 4 pgs.
Irran et al., "Ternesit, $Ca_5(SiO_4)_2SO_4$, a new Mineral from the Ettringer Bellerberg/Eifel, Germany", Mineralogy and Petrology, vol. 60, No. 1-2 (1997), pp. 121-132.
Kurdowski et al., "Mineral Composition of Build-Up in Cement KILN Preheater", Journal of Thermal Analysis and Calorimetry, vol. 55 (1999), pp. 1021-1029.
Marroccoli et al., "Synthesis of Calcium Sulfoaluminate Cements From $Al_2O_3$-Rich By-products From Aluminium Manufacture", $2^{nd}$ International Conference on Sustainable Construction Materials and Technologies Jun. 28-30, 2010, University Politecnica Delle Marche, Ancona, Italy, No. 2 (2010), pp. 1-9, XP002645670.
Sherman et al., "Long-term behaviour of hydraulic binders based on calcium sulfoaluminate and calcium sulfosilicate", Cement & Concrete Research, vol. 25, No. 1 (1995), pp. 113-126.
Stark, "Zernent and Kalk: Der Baustoff als Werkstoff", Jan. 1, 2000. Birkhauser. Basel, XP002679558, ISBN: 3-7643-6216-2, p. 61.
Bullerjahn, U.S. PTO Notice of Allowance, U.S. Appl. No. 14/239,319, Dec. 29, 2014, 13 pgs.
Bullerjahn, U.S. PTO Notice of Allowance, U.S. Appl. No. 14/239,339, Jan. 12, 2015, 13 pgs.
Bullerjahn, U.S. PTO Notice of Allowance, U.S. Appl. No. 14/239,348, Jan. 5, 2015, 11 pgs.
Bullerjahn, U.S. PTO Notice of Allowance, U.S. Appl. No. 14/238,872, Dec. 16, 2014, 14 pgs.

(56) References Cited

OTHER PUBLICATIONS

Japanese Office Action, Application No. 2014-525336, Mar. 3, 2015, 4 pgs.

Odler, Special Inorganic Cements:, (2000), pp. 65, 66, 78, ISBN: 0-419-22790-3, https://books.google.co.jp/books?id=p6YTKgk8mBgC&pg=PA66&dg=C4A3&f=false.

Makhmudova et al., "Synthesis and Properties of Sulphoferrite Calcium Clinkers and Low Temperature Cements on their Basis", Journal of the University of Chemical Technology and Metallurgy, vol. 46, No. 2 (2011), pp. 151-154.

"CaO—Al2O3—SO3—SiO2", P051045:10946, Mar. 11, 2015, pp. 95-98.

Li et al., "Microwave sintering of sulphoaluminate cement with utility wastes", Cement and Concrete Research, vol. 31, No. 9 (2001), pp. 1257-1261.

Bullerjahn, U.S. PTO Notice of Allowance, U.S. Appl. No. 14/238,872, May 8, 2015, 12 pgs.

Bullerjahn, U.S. PTO Notice of Allowance, U.S. Appl. No. 14/239,319, May 8, 2015, 11 pgs.

Bullerjahn, U.S. PTO Notice of Allowance, U.S. Appl. No. 14/239,339, May 8, 2015, 12 pgs.

Bullerjahn, U.S. PTO Notice of Allowance, U.S. Appl. No. 14/239,348, May 12, 2015, 11 pgs.

Bullerjahn, U.S. PTO Office Action, U.S. Appl. No. 14/238,976, Apr. 16, 2015, 22 pgs.

Chinese Office Action and English translation thereof, Appl. No. 201280040095.9, Mar. 19, 2015, 16 pgs.

Chinese Office Action and English translation thereof, Appl. No. 201280040099.7, Feb. 13, 2015, 21 pgs.

Chinese Search Report and English translation thereof, Appl. No. 201280040006.0, Apr. 28, 2015, 4 pgs.

Bullerjahn, U.S. PTO Notice of Allowance, U.S. Appl. No. 14/238,976, Aug. 12, 2015, 9 pgs.

Mao Ruoqing et al., "Investigation on the Hydraulicity of $3C_2S$—$3CaSO_4$—$CaF_2$", Journal of Wuhan University of Technology, vol. 17, No. 2 (1995), pp. 1-4.

\* cited by examiner

Figure 4, Weight loss (chemically bound water) after 28d

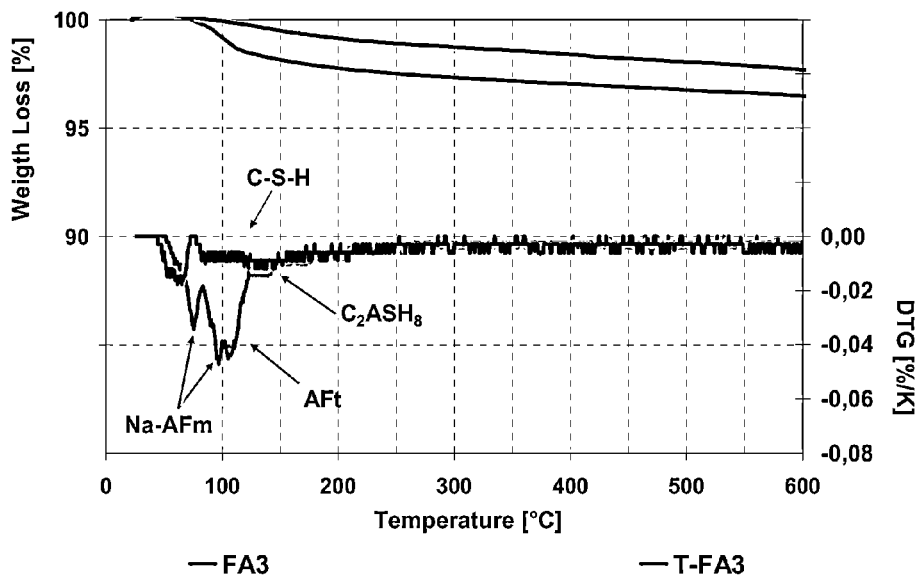
Figure 5, Weight loss (chemically bound water) after 28d
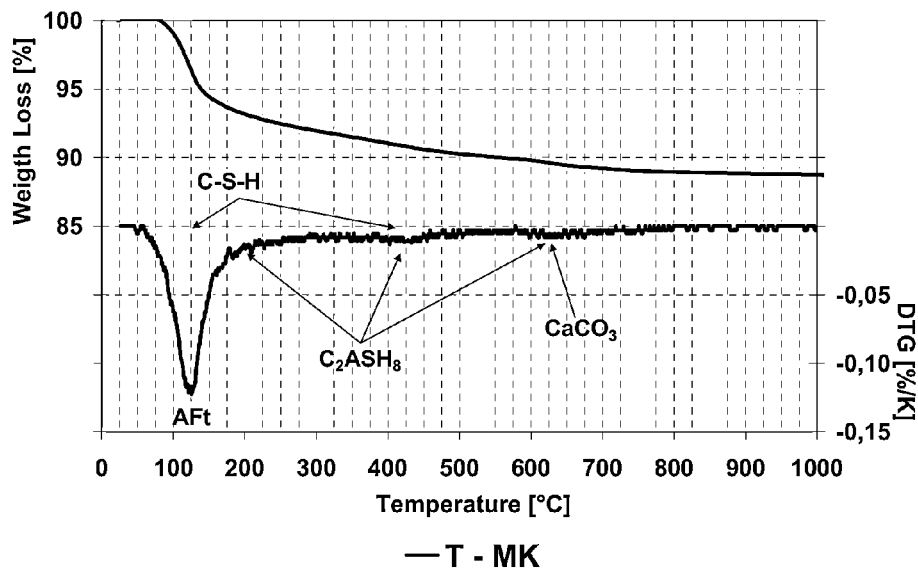
Figure 6, Weight loss (chemically bound water) after 7d

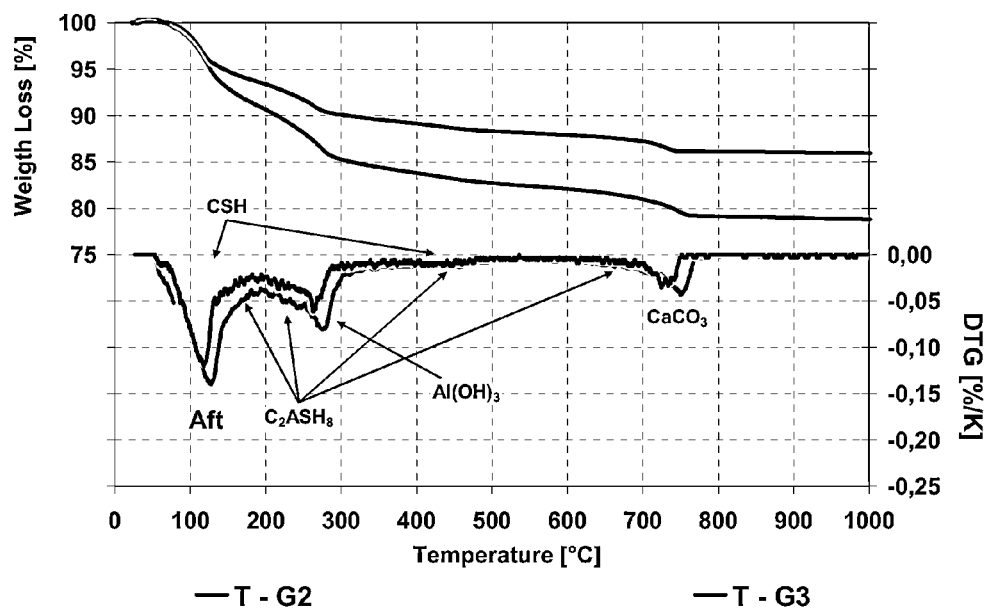
Figure 7, Weight loss (chemically bound water) after 7d

TERNESITE USED AS AN ACTIVATOR FOR LATENT-HYDRAULIC AND POZZOLANIC MATERIALS

CROSS-REFERENCE TO RELATED PATENT APPLICATIONS

This application is a National Stage of International Application No. PCT/EP2012/002979, filed Jul. 16, 2012, which is based upon and claims the benefit of priority from prior European Patent Applications No. 11006757.6, filed Aug. 18, 2011, No. 11008570.1, filed Oct. 26, 2011, No. 12001488.1, filed Mar. 5, 2012, No. 12002111.8, filed Mar. 26, 2012, No. 12002342.9, filed Mar. 30, 2012, and No. 12003718.9, filed May 10, 2012, the entire contents of all of which are incorporated herein by reference in their entirety.

The present invention relates to hydraulic binders based on latently hydraulic and/or pozzolanic materials, such as ground granulated blast furnace slag and/or tempered clays/shale, fly ash, and a method for activating latently hydraulic and/or pozzolanic materials.

Ground granulated blast furnace slag is a vitrified, granulated blast furnace slag. Blast furnace slag is created in the production of pig iron in a blast furnace when the $Al_2O_3$— and $SiO_2$— rich components of the nonmetallic ore companion element phases and the coke breeze bond with the limestone flux in the melting process to form calcium aluminate silicates. Thus, it takes on important metallurgic roles. It frees the pig iron from the sulphur of the coke, frees the furnace of alkalis and protects the pig iron against reoxidation. The blast furnace slag is less dense and therefore floats on the iron. The melting point is minimized by optimizing the composition thereof and, due to the low viscosity thereof, it is ensured that it can be easily separated from the liquid iron. If the molten blast-furnace slag is cooled slowly on exposure to air, it crystallizes nearly completely, thereby producing a lumpy, hard, hydraulically inactive material. This material, which is referred to as blast-furnace lump slag, is practically inert to water in the finely ground state. Due to this property and the hardness thereof it is used for road construction, for example.

Since 1862 it has been known that a sand-like, glassy granulate having latently hydraulic properties can be produced by quenching the molten blast-furnace slag with water. In this "granulation", the melt is cooled very rapidly from approximately 1500° C. with an up to 10-fold water surplus to a temperature below the so-called transformation temperature of 840° C. and is broken. The term "ground granulated blast furnace slag" (Hüttensand) has been used to an increasing extent for such "granulated" blast-furnace slags since the beginning of the 20th century and, in 1954, was defined as the designation by the Verein Deutscher Eisenhüttenleute.

Hydraulic binders can harden on exposure to air or under water in the finely ground state after mixing with water. Materials are deemed to be hydraulic that exhibit said hardening in the pure state, e.g. Portland cement clinker. Materials are deemed to be latently hydraulic when they are basically capable of hardening hydraulically but require one or more activators to do so, such as ground granulated blast furnace slag and artificial glasses (having a chemical composition similar to that of ground granulated blast furnace slag). The characterization "latently hydraulic" is used to describe the special properties of ground granulated blast furnace slags and binders that are comparable thereto. It indicates that a certain agent is similar to Portland cement with respect to the capability thereof to harden hydraulically and with respect to the chemism thereof. A latently hydraulic binder therefore contains reactive $SiO_2$ and reactive CaO in a quantity that is sufficiently great to harden hydraulically with the aid of an external impetus (activator) with water, forming calcium silicate hydrates.

In contrast thereto, pozzolans or pozzolanic materials are natural or industrially produced substances such as tempered clays and shale, trass, grog, fly ash that is lime-rich (e.g. according to DIN EN 450-1) [V] but in part also lime-poor (>10% by weight, e.g. DIN EN 197-1) [W], which contain reactive $SiO_2$ alone or in combination with $Al_2O_3$ and/or $Fe_2O_3$, but which cannot harden independently with water. Puzzolanes basically contain little or no CaO, with a few exceptions such as W fly ashes. Therefore, in contrast to latently hydraulic binders, they absolutely require the addition of CaO or $Ca(OH)_2$ in order to harden hydraulically in a manner based on the formation of calcium silicate hydrates.

Lime-rich fly ash, trass, grog and tempered clays and shale can have latently hydraulic or pozzolanic properties depending on the chemical and mineralogical composition thereof, primarily with respect to the contents and distribution of reactive CaO, $SiO_2$ and $Al_2O_3$ (reactive phase, glass content, etc.).

Fly ash is obtained via the electrostatic or mechanical separation of dust-like particles from the flue gasses of combustion plants. Fly ash particles are typically present primarily in the form of glass beads According to data from the FEhS Institutes für Baustoff-Forschung e.V. from the year 2006, 142 European ground granulated blast furnace slags examined in the years 1995 to 2006 had the mean composition presented in table 1 (contents of the main components in %, corrected for ignition loss):

TABLE 1

|  | Mean | Min. | Max. |
| --- | --- | --- | --- |
| CaO | 39.4 | 30.7 | 45.6 |
| MgO | 8.8 | 3.5 | 17.3 |
| $SiO_2$ | 36.8 | 30.7 | 44.0 |
| $Al_2O_3$ | 11.2 | 5.4 | 16.4 |
| FeO | 0.6 | 0.1 | 2.2 |

The mean glass content of these ground granulated blast furnace slags was 95%.

Intensive research activities over time have made it possible to identify and render useful certain groups of substances as activators of the latently hydraulic properties of ground granulated blast furnace slags. Basically, the following statements can be considered verified with respect to the hydraulic activity of ground granulated blast furnace slags:

An increase in the basicity $CaO/SiO_2$(C/S ratio) results in an increase in reactivity.

The hydraulic hardening capability increases as the content of CaO and MgO increases Higher contents of aluminum oxide increase the initial strength under the following conditions:

This statement applies for the glassy portion of the ground granulated blast furnace slag;

The binders contain sulphate-carriers for binding the aluminum through the formation of ettringite.

Currently there are primarily two basic forms of activation: alkaline and sulphate activation. The activating effect of the basic hydrated lime on latently hydraulic and/or pozzolanic materials, which is illustrated here using ground granulated blast furnace slag as an example, was recognized at an early stage and was used commercially as early as 1865 to manufacture slag bricks. Portland cements containing ground granulated blast furnace slag were first produced in 1879 and the activating effect of the hydrated lime produced in the hydration of the calcium silicates was utilized together with the alkali hydroxides also present in the Portland cement in this way. In this case, the hydrated lime released from the Portland cement functions as an activator of the latently hydraulic properties of the ground granulated blast furnace slag and, in contrast to the role thereof in the pozzolans, is not limited to the task of forming new, hardness-relevant quantities of calcium silicate hydrates by reaction with reactive $SiO_2$.

The latently hydraulic properties of ground granulated blast furnace slag have resulted in their having been used for decades to a continuously increasing extent as a component of cements. According to EN 197-1, ground granulated blast furnace slag can be contained in a portion between 6% and 35% in the Portland slag cements CEM II/A-S and CEM II/B-S, and in a portion between 36% and 80% in the blast-furnace cements CEM III/A and CEM III/B, and can replace corresponding portions of clinker. Since the CaO content of ground granulated blast furnace slag is approximately 40% on average and is therefore only approximately ⅔ of the mean CaO content of Portland cement CEM I, the production of cements containing ground granulated blast furnace slag is naturally associated with a reduction in $CO_2$ emissions, which is directly proportional to the ground granulated blast furnace slag content thereof.

An increasing portion of latently hydraulic and/or pozzolanic materials in Portland cement is also advantageous in terms of the permanence thereof and resistance to aggressive, e.g. to sulphate-containing or weakly acidic, water.

A main, limiting criterium for the quantity of latently hydraulic and/or pozzolanic materials used in the cement, however, is the fact that an increasing replacement of finely ground Portland cement clinker by, for example, ground granulated blast furnace slag of comparable fineness results in a systematically decreasing compressive strength in mortar and concrete in the first days after having been mixed with water. Although this phenomenon was referred to in the past as "lower reactivity", the reactivity concept is now viewed in an increasingly differentiated manner. It has been shown that ground granulated blast furnace slags that are classified as "poorly reactive" in terms of their capability to react with water, i.e. that are more corrosion-resistant, regularly result in greater early strengths in mixtures with Portland cements than do identical mixtures with "reactive" ground granulated blast furnace slags. In this regard, more and more attempts are being made to prevent the formation of unfavorable reaction products, which result in lower compressive strengths, in the "reactive" ground granulated blast furnace slags by way of suitable additives.

In contrast to alkaline excitation, which is effective primarily in Portland cements containing ground granulated blast furnace slag, sulphate activation, which was discovered by H. Kühl, is based, in the first step, on the formation of ettringite, that is, a direct chemical reaction between the $Al_2O_3$ content of the ground granulated blast furnace slags, low quantities of added hydrated lime and 15 to 20% of added calcium sulphate.

In the field of so-called super sulfated cements as well, various manufacturers of construction materials have recently been working actively toward the goal of overcoming the known disadvantages of this binder system. The decreasing early strengths obtained by continuously reducing the $Al_2O_3$ content of the ground granulated blast furnace slags eventually led, in the 1970's, to the retraction of the DIN 4210 standard, which had existed since 1937.

Only one other activation mechanism in addition to alkaline and sulphate activation of ground granulated blast furnace slag has been known, apart from the basic option to heat.

The non-previously published document PCT/EP 2011/005314 describes that magnesium hydroxide carbonate, which is weakly alkaline and nearly insoluble in water, is suitable—as an additive in ground granulated blast furnace slag that has been ground to an extent common for cement, after having been mixed with water to form a paste or mortar—for reacting with the ground granulated blast furnace slag practically completely within a short period of time and thereby inducing a hardening process.

The object of the invention was that of creating a further activation mechanism that is capable of triggering latently hydraulic and/or pozzolanic materials such as finely ground ground granulated blast furnace slags, industrial and natural (fly) ash, artificial glasses and tempered clays/shale, also without the use of the known, highly alkaline or sulphate activation (by anhydrite, basanite and/or gypsym), to undergo a strength-forming reaction within a few hours after having been mixed with water.

Surprisingly it was found that ternesite, a phase of the composition $C_5S_2\$$ that has been largely considered inert, is capable of activating the hydraulic reaction of latently hydraulic and/or pozzolanic materials.

The invention therefore solves the above-mentioned problem using hydraulic binders on the basis of latently hydraulic and/or pozzolanic material and ternesite, and by a method for activating latently hydraulic and/or pozzolanic materials by adding ternesite/ternesite-containing clinkers/cements.

It is furthermore advantageous that ternesite, unlike previous sulphate sources, still provides sulphate also at late stages in the course of hydration. Released, reactive aluminium, e.g. in the form of amorphous aluminium hydroxide (gel) and/or $Al(OH)_4^-$, can therefore harden with this sulphate at later stages. Ternesite is therefore particularly suitable for use also in Portland slag cement, blast furnace cement and other composite cements that contain "supplementary cementitious materials" (SCM).

Furthermore, the continuous formation/release of $Al(OH)_4^-$ or amorphous aluminium hydroxide (gel) results in a progressive reaction of the $C_5S_2\$$ phase. On the one hand, additional sulphate is made available as a result, which, in turn, stabilizes $AF_t$ and prevents/reduces a possible transformation to $AF_m$. On the other hand, a reactive form of $C_2S$ is released, $C_5S_2\$$ or $(C_2S)_2.C\$ \leftrightarrows 2\ C_2S+1\ C\$$, which can also react with water but also with the available $Al(OH)_3$ and thereby form $C_2AS.8H_2O$ (stratlingite) and C-(A)-S—H. The stabilization of $AF_t$ and the consumption of $Al(OH)_3$ and the reduction in porosity by the formation of $C_2AS.8H_2O$ and C-(A)-S—H of the binder according to the invention results in a marked improvement of durability, for example, but not exclusively, by the reduction in overall porosity and/or the connected pore space, and the resistance to a possible sulphate attack.

The following abbreviations which are common in the cement industry are used: H—$H_2O$, C—CaO, A-$Al_2O_3$, F—$Fe_2O_3$, M-MgO, S—$SiO_2$ and \$-$SO_3$. To simplify the further description, most of the compounds will be indicated in their pure form without explicitly mentioning mixing series/substitution by foreign ions, etc., as is common in technical and industrial materials. As any person skilled in the art understands, the composition of the phases indicated by name in the present invention can vary by the substitution with various foreign ions, depending on the chemism of the raw meal and the type of manufacture, wherein such compounds also fall within the scope of protection of the present invention and are intended to be covered by the reference to the pure phases/compounds.

Ternesite ($C_5S_2\$$, which is also known as sulfospurrite, sulphate spurrite or calcium sulfosilicate) is a phase that forms in the sintering of raw material mixtures that contain sources for CaO, $SiO_2$ and $SO_3$ at temperatures of up to 900° C. to 1200° C. and, possibly, up to 1300° C. Ternesite therefore typically does not occur in the production of Portland cement clinker since it is sintered at a much higher temperature. However, ternesite has often been observed as a by-product (that is mostly unwanted because it is unreactive) in the manufacture of calcium sulfoaluminate-based cements. Investigations carried out on calcium sulfo-aluminate cements regularly showed that ternesite does not react hydraulically or does so very slowly, refer, for example, to Belz et al., "Use of Fly Ash, Blast-furnace slag, and Chemical Gypsum for the synthesis of calcium sulfoaluminate-based cements", Proc. 5th Int. Conf. Fly Ash, Silica Fume, Slag and Natural Pozzolanes in Concrete, Milwaukee, Ed.: V. M. Malhotra, ACI SP-153, volumn 1, pp. 513-530 (1995), Beretka et al., "Energy-Saving Cements obtained from Chemical Gypsum and other industrial Wastes", Waste Manangement, volumne 1, pp. 231-235 (1996), Shermann et al, "Long-Term Behaviour of Hydraulic Binders based on Calciumsulfoaluminate and Calciumsulfosilicate", Cement and Concrete Research, volume 1, pp. 113-126 (1995), Beretka et al., "Synthesis and Properties of low energy cements based on $C_4A_3\$$", Proc. 9th Int. Congr. Chem. Cement, New Delhi, volume 3, pp. 195-200 (1992), Beretka et al., "Utilisaton of industrial wastes and by-products for the synthesis of special cements", Resources, Conserv. and Recycling, volume 9, pp. 179-190 (1993).

From EP 1 171 398 special clinkers are known that have high concentrations of crystal $X=\{(C, K, N, M)_4(A, F, Mn, P, T, S)_3(Cl, \$)\}$ and crystal $Y=\{(C_2S)_3(C\$)_3Ca(f, cl)_2\}$ or $C_9S_3\$_3Ca(f, Cl)_2$ and/or crystal $Z=\{C_5S_2\$\}$. Said clinkers are mixed with hydraulic cement or a Portland-type cement to obtain finished binders.

Said documents do not show that ternesite can be used as an activator for latently hydraulic and/or pozzolanic materials such as ground granulated blast furnace slag or metakaolin, or a strength formation of binders made of ternesite and latently hydraulic and/or pozzolanic materials. It was surprising, therefore, to discover that ternesite in combination with latently hydraulic and/or pozzolanic materials provides an early strength that is adequate or even high.

$C_5S_2\$$ can be produced by sintering raw materials that provide sufficient quantities of CaO, $SiO_2$ and $SO_3$. Pure or substantially pure raw materials such as calcium carbonate or oxide, quartz powder or microsilica, and calcium sulphate are suitable on the one hand. On the other hand, it is possible to use a plurality of natural or industrial materials such as, for example but not exclusively, limestone, bauxite, clay/claystone, calcined clays (e.g. metakaolin), basalts, periodite, dunite, ignimbrite, carbonatite, ashes/slags/ground granulated blast furnace slags of high or low quality (mineralogy/glass content, reactivity, etc.), various dump materials, red and brown mud, natural sulphate carriers, sulphate plant muds, phosphogypsum, furnace gas gypsum, titano-gypsum, fluorogypsum, etc. in a suitable combination as the raw material. Substances/substance groups that satisfy the minimum chemical requirements for potential raw materials but that are not explicitly named are also covered by the scope of protection. The raw materials can be pretreated, although this is not necessary.

The use of less pure raw materials results in the increased formation of $Al_2O_3$— and $Fe_2O_3$-rich clinker phases such as $C_4A_3\$$ and $C_4AF$, for example. Preferably, however, iron can also be incorporated in the $C_4A_3\$$ phase. The incorporation of foreign ions can result in an elevated formation speed of the phase in the hot zone, which, in turn, potentially reduces the residence time required and/or can result in the quantitative increase thereof. As is the case for the designation $C_4(A_x F_{(1-x)})_3\$$ for the clinker phase, the designation $Al_2O_3(Fe_2O_3)$ also means that aluminium can be substituted in part by iron, i.e. x is a number from 0.1 to 1.0, preferably from 0.8 to 0.95. Aluminum is typically present with small admixtures of iron, although the use of large quantities of iron up to a preponderant content of iron falls within the scope of the invention.

Evidence of the incorporation of iron is the quantitative decrease of iron-rich phases (e.g. $Fe_3O_4$, $C_2F$ and $C_4AF$), the increase of the phase $C_4A_3\$$ or $C_4(A_xFe_{(1-x)})_3\$$, and the increase in the peak intensities and lattice parameter c (Å) [crystal system: orthorhombic] from 9.1610 [PDF number: 01-085-2210, Tetracalcium hexaaluminate sulphate(VI)— $Ca_4 (Al_6O_{12})(SO_4)$, ICSD collection code: 080361, calculated from ICSD using POWD-12++, (1997), structure: Calos, N. J., Kennard, C. H. L., Whittaker, A. K., Davis, R. L., J. Solid State Chem., 119, 1, (1995)] over 9.1784 [PDF number: 00-051-0162, Calcium Aluminum Iron Oxide Sulfate— $Ca_4((Al_{0.95}Fe_{0.05}))_6O_{12}(SO_4)$, ICSD collection code: —, primary reference: Schmidt, R., Pöllmann, H., Martin-Luther-Univ., Halle, Germany., ICDD Grant-in-Aid, (1999)] up to values over 9.2000. The examination to determine a possible formation of solid solution crystals can also be carried out by determining the occupation factors in a Rietveld adaptation by under-occupations or mixed occupations of individual atomic layers. The color change of the clinkers, which can be distinct, is another purely qualitative indicator. The color of the clinkers changes from a chestnut brown/ocher to greenish brown to a light shade of gray.

Ternesite also occurs as a mineral, but there are no known deposits from which it can be obtained in sufficient quantities or purity, so that the use of "natural" ternesite is indeed possible but is actually uneconomical. Production by sintering suitable raw materials is preferred according to the invention.

The raw materials for the production of ternesite or the ternesite clinker are ground to common finenesses in a manner known per se. Finenesses of 2000 to 10000 $cm^2/g$, preferably in the range of 3000 to 6000 $cm^2/g$ and, particularly preferably, from 4000 to 5000 $cm^2/g$ are particularly well suited. The grinding fineness depends primarily on the type and composition of the raw material that is used, the burning process (temperature, residence time in the sintering zone, etc.) and the desired properties of the binder and the technical possibilities that are available.

The clinker containing $C_5S_2\$$ requires very little energy to grind, especially when it comprises few other phases, thereby allowing it to be adjusted to greater finenesses of the clinker that contains $C_5S_2\$$ by way of separate grinding or pre-grinding, for example when higher reactivity (faster conversion/consumption) of $C_5S_2\$$ is desired. If so required for a special application, the ground product can have a particle size distribution of d50 less than 20 µm and d90 less than 100 µm, or a d50 less than 5 µm and a d90 less than 20 µm or a d50 less than 0.1 µm and a d90 less than 2 µm.

If the objective of production is to obtain the purest $C_5S_2\$$ possible, raw materials are selected that have no components other than sources for CaO, $SiO_2$ and $SO_3$, or only a few further components. The conversion of calcium carbonate with quartz powder and calcium sulphate in the temperature range of typically 900 to 1300° C., preferably 1000 to 1200° C. and, more preferably, 1050 to 1150° C. yields $C_5S_2\$$ with a purity of >99%.

It is preferable, however, to use the greatest possible portion of low-cost and environmentally compatible raw materials to produce $C_5S_2\$$. "Environmentally compatible" means using the least amount of energy possible and/or thoughtful utilization of natural raw materials and high-quality waste products and byproducts. In this case, pure $C_5S_2\$$ is not obtained, but rather a ternesite clinker, which contains components in addition to $C_5S_2\$$. The type and portions of the components can be controlled by way of the composition of the raw meal, the sintering temperature and the heating rate, wherein the aim is always to obtain a content of $C_5S_2\$$ of at least 10% by weight, preferably at least 30% by weight of and especially preferred at least 40% by weight. It was found that $C_5S_2\$$ is formed or stabilized even at higher sinter temperatures when the raw meal mixture contains mineralizers such as phosphate, fluoride, borium, nitrate, chloride, sodium and potassium and/or when a high heating rate is selected. Finally, a higher content of $C_5S_2\$$ can also be obtained by tempering after sintering, wherein the content of $C_5S_2\$$ is formed at the expense of other phases, as described in EPI 1006757.6, the contents of which are incorporated herein by reference in this respect.

Mineralizers are substances that act as fluxing agent and/or lower the temperature required to form a melt and/or that promote the formation of the clinker compound, for example by the formation of solid solution crystals and/or phase stabilization.

The temperature range for sintering the raw meal, from 900° C. to 1300° C., preferably from 1000° C. to 1200° C., and more preferably from 1050 to 1150° C. should be applied for a period of 10 min to 180 min, preferably 25 min to 120 min and, more preferably, 30 min to 60 min. For the further formation of desired phases, the clinker can be subjected to the range of 900° C. to 750° C. for a period of 5 min to 120 min, preferably 10 min to 60 min, during cooling. Finally, or without delayed cooling across the range of 900° to 750° C., the clinker is cooled rapidly in a manner known per se, thereby preventing further phase conversions.

The ternesite clinker containing $C_5S_2\$$ as the main component or a cement obtained therefrom by grinding, without additives, contains the following components according to the invention in the portions indicated:

$C_5S_2\$$ 10 to 100% by weight, preferably 30 to 95% by weight and, more preferably, 40 to 90% by weight ($\alpha$, $\beta$) $C_2S$ 0 to 90% by weight, preferably 5 to 70% by weight and, more preferably, 10 to 60% by weight $C_4(A_xF_{(1-x)})_3\$$ 0 to 30% by weight, preferably 3 to 25% by weight and, more preferably, 5 to 20% by weight $C_2(A_yF_{(1-y)})$ 0 to 30% by weight, preferably 5 to 20% by weight and, more preferably, 8 to 15% by weight reactive aluminates 0 to 20% by weight, preferably 1 to 15% by weight and, more preferably, 3 to 10% by weight periclase (M) 0 to 25% by weight, preferably 1 to 15% by weight and, more preferably, 2 to 10% by weight secondary phases 0 to 30% by weight, preferably 3 to 20% by weight and, more preferably, 5 to 10% by weight based on the total quantity of clinker/cement, wherein the portions of the phases add up to 100%.

The designation ($\alpha$, $\beta$) $C_2S$ means this can be polymorphs of $C_2S$ and the mixtures thereof, wherein the reactive polymorphs (e.g. $\alpha$, $\alpha'_L$, $\alpha'_H$) are preferred. Preferably at least 5% by weight of a polymorphs of $C_2S$ are present since they advantageously contribute to great early strength. By adding mineralizers to the raw meal, a portion up to a preponderant portion of the dicalcium silicates can be present in the form of solid solution crystals or of doped "$\alpha$" $C_2S$, for example in the presence of $P_2O_5$ as calcium phosphate silicate $[Ca_2SiO_4 \cdot 0.05Ca_3(PO_4)_2]$. Moreover, it turned out that the addition of mineralizers promotes/induces the formation of a melting phase.

In phase $C_4(A_xF_{(1-x)})_3\$$, x is in the range 0.1 to 1, preferably 0.8 to 0.95. In phase $C_2(A_yF_{(1-y)})$, y is in the range 0.2 to 0.8 and preferably in the range 0.4 to 0.6.

Reactive aluminates designate $C_3A$, CA and $C_{12}A_7$, for example, but not exclusively.

Secondary phases can, for example but not exclusively, be in the form of alkali/alkaline-earth sulphates, quartzes, spinels, olivines, pyroxenes, representatives of the melilite and merwinite group, free lime, spurrite, quartz and/or an X-ray-amorphous phase state/a glass phase, in a portion of 0% by weight to 30% by weight, preferably 2% by weight to 20% by weight and, particularly preferred, 5% by weight to 15% by weight. The free lime content of the clinker is below 5% by weight, preferably below 2% by weight and, more preferred, below 1% by weight.

The contents of the main oxides of a clinker that contains $C_5S_2\$$ as the main phase and is produced separately cover the following ranges:

CaO 35 to 70% by weight, preferably 40 to 60% by weight and, more preferably, 50 to 55% by weight $SiO_2$ 5 to 35% by weight, preferably 10 to 25% by weight and, more preferably, 15 to 23% by weight $SO_3$ 3 to 30% by weight, preferably 5 to 26% by weight and, more preferably, 8 to 22% by weight $\Sigma(Al_2O_3+Fe_2O_3)$ 0 to 40% by weight, preferably 5 to 30% by weight and, more preferably, 8 to 20% by weight MgO 0 to 25% by weight, preferably 2 to 15% by weight and, more preferably, 5 to 10% by weight based on the total quantity of clinker/cement, wherein the portions of the contents add up to 100%.

The separate production of ternesite or a clinker or cement having ternesite as at least one of the main components has the advantage that ternesite or said clinkers can be produced in one step in a temperature range of typically 900 to 1300° C., preferably 1000 to 1200° C. and, more preferably, 1050 to 1150° C. The low burning temperatures (<1100° C.) result in the added advantage that higher contents of magnesium/periclase (>2% by weight) can be specifically set in the clinker. Due to the low burning temperature, periclase can be present in a reactive form and can contribute to the strength development/hydration. Higher burning temperatures can also be used, however, depending on the mixture of raw materials, provided ternesite is formed in large portions, preferred are 10 to 100% of the clinker.

Surprisingly, it was found that artificial and natural (hardened) pozzolans (for example, but not limited to grog, fly ash, tuff, trass, sediment having a high portion of soluble silicic acid, tempered clays and shale, artificial glasses, etc.), latently hydraulic materials (for example, but not limited to ground granulated blast furnace slag, artificial glasses, etc.) and combinations thereof can be added to ternesite/ternesite clinkers in relatively high amounts and be activated to undergo a hydraulic reaction accompanied by solidification.

According to the invention, the ternesite or ternesite clinkers are mixed, before or after grinding, with at least one latently hydraulic and/or pozzolanic material to form a binder.

Within the scope of the present invention, clinker designates a sintered product that is obtained by burning a raw material mixture at a high temperature and contains at least one hydraulically active phase. The term cement refers to a clinker that is ground with or without the addition of further components. A binder or a binder mixture designates a hydraulically hardening mixture containing cement and, typically but not necessarily additional finely ground components, that is used after the addition of water and, optionally, admixtures and mineral aggregate.

A clinker can already contain all the phases that are necessary and desired and, after grinding to form a cement, can be used directly as a binder. According to the invention, the composition of the binder is obtained by mixing two or more clinkers and/or cements, wherein the mixing takes place before (or during) grinding and/or in the ground state and/or during production of the binder. Unless a point in time for the mixing is not stated explicitly, the following descriptions relate to binders (and cements) that are not limited in this regard.

Unless indicated otherwise, "reactive" refers to hydraulic reactivity. Reactive aluminum compounds refer in particular to substances that provide aluminum to the reaction after water is added.

Phases, such as $C_5S_2\$$, for example, are presented primarily stoichiometrically, although the exact composition can deviate/vary. Furthermore, various foreign ions from the group of the halogens, non-metals, alkaline and alkaline earth metals, and representatives of the transition metals and semi-metals and metals can be incorporated into the crystal structure of the phase. These are all suitable for the ternesite clinker. Phosphate, fluoride, borium, nitrate, chloride, sodium and/or potassium, for example, are preferably incorporated into the structure of $C_5S_2\$$ for the stabilization thereof (e.g. at high temperatures >1200° C.).

In the binder according to the invention at least one latently hydraulic and/or pozzolanic material is mixed with ternesite or a ternesite clinker. The amounts are highly variable, preferably 5 to 95% by weight of latently hydraulic and/or pozzolanic material and 5 to 95% by weight of ternesite clinker are added. Preferred are 30 to 85% by weight of latently hydraulic and/or pozzolanic material and 15 to 70% by weight of ternesite, more preferably 40 to 80% by weight of latently hydraulic material and 20 to 60% by weight of ternesite, wherein the values are relative to the total quantity of binder, and the portions in combination with those of the remaining binder components add up to 100%.

Preferred pozzolans/latently hydraulic materials are tempered clays (e.g. metakaolin) and shale, V and W fly ash having a high portion of glass and/or a high content of reactive phases, ground granulated blast furnace slags and artificial (pozzolanic and latently hydraulic) glasses.

Preferably, the binder made of ternesite/ternesite clinker and latently hydraulic and/or pozzolanic material also contains admixtures and/or additives and, optionally, other hydraulically active components and/or sulphate carriers. The additives are hydraulically inactive components, such as, for example but not exclusively, ground limestone/dolomite, precipitated $CaCO_3$, $Mg(OH)_2$, $Ca(OH)_2$, CaO, silica fume and glass powder. The additives can be metered, in sum, in a quantity in the range of 1 to 25% by weight, preferably 3 to 20% by weight, and, more preferably, 6 to 15% by weight.

Alkali- and/or alkaline-earth sulphates are particularly suited as the sulphate, preferably in the form of gypsum and/or hemihydrate and/or anhydrite and/or magnesium sulphate and/or sodium sulphate and/or potassium sulphate.

In a preferred embodiment, the binder contains at least one hydraulic material, preferably Portland cement. The Portland cement can predominate in terms of quantity, as is the case with the Portland slag cements, or, as is the case with the blast furnace cements and composite cements, can contain comparable quantities of Portland clinker and a mixture of latently hydraulic material comprising ternesite up to a preponderant mixture of latently hydraulic material having ternesite. Preferably, the binder can contain Portland cement in a ratio of 1 to 70% by weight, more particularly 5 to 40% by weight, and more particularly 10 to 25% by weight.

Ternsite clinker, the latently hydraulic and/or pozzolanic material and additives that may be present, such as limestone and/or Portland cement clinker and/or other clinkers and/or sulphate carriers are ground in the binder according to the invention to a fineness (according to Blaine) of 2000 to 10000 $cm^2/g$, preferably 3000 to 6000 $cm^2/g$ and, more preferred, 4000 to 5000 $cm^2/g$. The grinding can take place separately or jointly in a manner known per se.

Preferably, the cement or the binder mixture also contains, as admixture, one or more setting and/or hardening accelerators, preferably selected from components having available aluminum or those that release aluminum upon contact with water, for example in the form of $Al(OH)_4^-$ or amorphous $Al(OH)_3$ gel, for example but not exclusively, soluble alkali-/alkaline-earth aluminates and aluminium salts (e.g. $Na_2Al_2O_4$, $K_2Al_2O_4$, aluminium nitrate, aluminium acetate, aluminium chloride, aluminium formiate, aluminium sulphate, etc.), reactive and/or amorphous aluminium hydroxide (e.g. $Al(OH)_3$), calcium aluminate cement, calcium sulfoaluminate cement and/or geopolymer binders. Furthermore, the cement or the binder mixture can contain, as the admixture, one or more setting and/or hardening accelerators, also in combination with the aforementioned components having available aluminium, preferably selected from lithium salts and hydroxides, other alkali salts and hydroxides, alkali silicates. The setting and/or hardening accelerators can be metered, in sum, in a quantity in the range of 0.01 to 15% by weight, preferably 0.5 to 8% by weight, and, more preferably, 1 to 5% by weight.

Hardening-accelerating additions, such as alkali-/alkaline-earth aluminates, aluminium salts, alkali salts, alkali silicates and alkali hydroxides that further increase the pH value of the solution and, therefore, the reactivity of $C_5S_2\$$ are particularly preferred.

It is furthermore preferred when concrete plasticizers and/or plasticizing admixtures and/or retarders, preferably on the basis of ligninosulfonates, sulfonated naphthalene-, melamine- or phenolformaldehyde condensate, or on the basis of acrylic acid-acrylamide mixtures or polycarboxylate ethers or on the basis of phosphated polycondensates, phosphated alkylcarbonic acid and salts thereof, (hydroxy)-carbonic acids and carboxylates, borax, boric acid and borates, oxalates, sulfanilic acid, amino carbonic acids, salicylic acid and acetylsalicylic acid, dialdehydes are contained.

The binder according to the invention can be used in a manner known per se for all applications in which Portland cement, Portland slag cement, composite cement, etc. are otherwise used. The binder is typically mixed with mineral aggregates and, optionally, other additions, for use as concrete, mortar, plaster, floor screeds, etc., and is mixed with water.

For the processing of the binder according to the invention, a water/binder value of 0.2 to 2 is suitable, preferably 0.3 to 0.8, and more particularly 0.35 to 0.5.

The cement according to the invention or the binder according to the invention is excellently suited for solidifying hazardous waste. A content of adsorptively effective additives such as zeolites and/or ion-exchange resins is preferred. A high pH value, which promotes the formation of poorly soluble hydroxides, can be advantageous for immobilizing heavy metals in anorganic binders. This can be implemented, for example but not exclusively, by mixing the binder according to the invention with Portland cement and/or alkali salts and alkali hydroxides.

A further advantage of the cement or the binder mixture thereof according to the invention is the formation of various phases over the course of hydration (e.g. ettringite [$AF_t$], monophases [$AF_m$], metal-metal hydroxy salts [LDH], etc.), which can incorporate and thereby permanently immobilize the various heavy metals and further harmful substances (chloride, etc., for example) in the structure thereof.

The invention is explained by reference to the following examples without being limited to the specially described embodiments. Unless indicated otherwise or provided the context does not require otherwise, the percentages are based on the weight, when in doubt on the total weight of the mixture.

The invention also relates to all combinations of preferred embodiments, provided they are not mutually exclusive.

When used in conjunction with a numerical value, the designations "around" or "approximately" mean that values that are higher or lower by at least 10% or values that are higher or lower by 5% and, in every case, values that are higher or lower by 1% are included.

BRIEF DESCRIPTION OF THE DRAWINGS

FIG. 4 shows thermogravimetric measurements of hydrated mixtures from fly ash with the ternesite clinker from example 1 after 28 days;

FIG. 5 shows thermogravimetric measurements of hydrated mixtures from fly ash with the ternesite clinker from example 1 after 28 days;

FIG. 6 shows thermogravimetric measurements of a hydrated mixture from meta kaolin with the ternesite clinker from example 1 after 7 days;

FIG. 7 shows thermogravimetric measurements of hydrated mixtures from amorphous $Al(OH)_3$ with the ternesite clinker from example 1 after 7 days.

EXAMPLES

Figure 1:
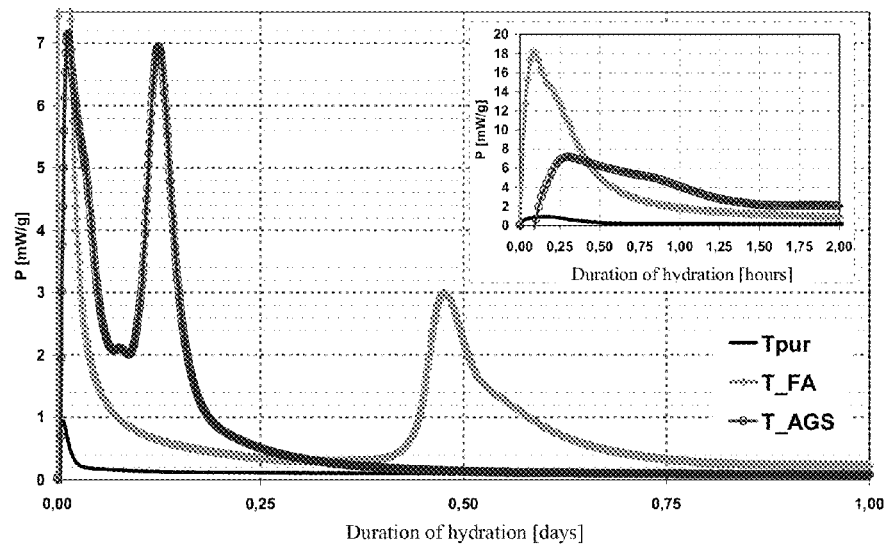
FIG. 1 shows the heat flow during hydration of the ternesite clinkers from examples 1 to 3.

The latently hydraulic and/or pozzolanic materials and raw materials that were used in the examples described below are characterized in table 2 on the basis of the oxidic main components and grinding fineness thereof. The weight loss after tempering at 1050° C. is also indicated. Table 3 shows the mineralogical phase composition of the latently hydraulic and/or pozzolanic materials that were used.

TABLE 2

Elementary composition of the raw materials that were used (RFA)

| Material Sample | | Limestone | Ground granulated blast furnace slag | Fly ash | | | Sulphate | Al corr. | Metakaolin |
|---|---|---|---|---|---|---|---|---|---|
| RFA | Unit | K1 | BFS | FA1 | FA2 | FA3 | MicroA | $Al(OH)_3$ | MK |
| GV 1050° C. | % | 43.09 | 1.80 | 0.82 | 0.10 | 2.79 | 4.64 | 34.64 | 1.91 |
| $SiO_2$ | | 1.53 | 36.48 | 28.50 | 45.60 | 47.44 | 4.17 | — | 48.00 |
| $Al_2O_3$ | | 0.35 | 11.58 | 12.50 | 20.60 | 27.88 | 1.36 | 65.36 | 41.60 |
| $TiO_2$ | | 0.03 | 0.88 | 1.05 | 0.68 | 1.38 | 0.04 | — | 0.00 |
| MnO | | 0.01 | 0.37 | 0.18 | 0.05 | 0.06 | — | — | 0.00 |
| $Fe_2O_3$ | | 0.19 | 0.52 | 5.18 | 8.17 | 5.89 | 0.37 | — | 1.80 |
| CaO | | 54.50 | 38.46 | 37.40 | 19.3 | 7.54 | 37.40 | — | 5.70 |
| MgO | | 0.22 | 7.52 | 4.81 | 2.17 | 2.48 | 1.82 | — | 0.10 |
| $K_2O$ | | 0.04 | 0.44 | 0.28 | 1.63 | 1.46 | 0.28 | — | 0.95 |
| $Na_2O$ | | 0.00 | 0.18 | 0.07 | 0.30 | 0.59 | 0.06 | — | 0.00 |
| $SO_3$ | | 0.01 | 2.19 | 7.71 | 1.13 | 0.29 | 49.80 | — | 0.00 |
| $P_2O_5$ | | 0.01 | 0.00 | 1.27 | 0.22 | 1.77 | 0.00 | — | 0.00 |
| Total | | 99.98 | 100.42 | 99.77 | 99.95 | 99.67 | 99.94 | 100.00 | 100.06 |
| Amorphous | % | / | >99 | 38.0 | 88.0 | 58.9 | — | — | >95 |
| Density | g/cm³ | 2.64 | 2.81 | 2.82 | 2.66 | 2.30 | — | — | 2.54 |
| Grinding finess according to Blaine | cm²/g | 3350 | 4370 | 4380 | 5500 | 4270 | — | — | — |

TABLE 3

Mineralogical phase composition of the fly ash that was used (QXRD according to Rietveld)

| Mineral | Unit | FA1 | FA2 | FA3 |
|---|---|---|---|---|
| Quartz | % by wt | 11.5 | 1.3 | 9.8 |
| Cristobalite | | 0.4 | — | — |
| Free lime | | 9.3 | 2.8 | 1.1 |
| Periclase | | 2.8 | — | 0.9 |
| Anhydrite | | 10.4 | 1.3 | 0.6 |
| Mullite | | — | 1.9 | 25.1 |
| Gehlenite | | 6.3 | — | — |
| Merwinite | | 4.9 | — | — |
| Maghemite | | 1.2 | 1.6 | 1.4 |
| Hematite | | 0.9 | — | 0.8 |
| Rutile | | — | — | 0.3 |
| Ye'elimite | | 3.1 | — | — |
| $C_3S$ | | — | 1.0 | — |
| $C_2S$ | | 8.1 | 1.4 | 1.1 |
| $C_4AF$ | | 3.1 | 0.7 | — |
| Amorphous | | 38.0 | 88.0 | 58.9 |

Example 1

$T_{pur}$

A stoichiometric mixture of $CaCO_3$ [Merck, analytically pure], $CaSO_4$ [Merck, analytically pure] and quartz powder [Merck, analytically pure] was burned for 1 h at 1100° C., subsequently cooled rapidly, ground and burned once more for 1 h at 1100° C. and cooled rapidly.

Example 2

$TK_{FA}$

The raw mixture consisted of 45% by weight of limestone (K1)+27% by weight of FA1, 20% by weight of MicroA and 8% by weight of quartz powder (Merck, analytically pure). The raw meal was sintered at 1100° C. and, after sintering, was subjected to a cooling program for tempering in which the temperature was lowered from 1100° C. to 850° C. over a period of approximately 35 minutes. The clinker was then cooled rapidly on exposure to air.

Example 3

$TK_{AGS}$

The raw mixture consisted of 58% by weight of K1+8% by weight of MK, 24% by weight of MircoA and 10% by weight of quartz powder (Merck, analytically pure). The raw meal was subjected to the same program as in example 2.

The calculated chemical composition and the measured mineralogical composition (QXRD according to Rietveld) of the ternesite clinker qualities from examples 1 to 3 are presented in table 4.

The measurement of the course of hydration carried out on a paste having a water/binder value (W/B)=0.50, which was produced from the various ternesite clinker qualities according to examples 1 to 3, using an isothermal differential calorimeter (TAM air) is presented in FIG. 1 as an excerpt (only up to 1 day since no further increases were recorded, as was the case with all samples). No appreciable development of heat was observed in the paste made of $T_{pur}$ within 24 hours. In the pastes made of $TK_{FA}$ and $TK_{AGS}$, a distinct development of heat was observed even within approximately 4 hours and 12 hours, respectively, which is indicative of a hydraulic reaction.

TABLE 4

Chemical and mineralogical composition of the clinkers

| | $T_{pur}$ | $TK_{FA}$ | $TK_{AGS}$ |
|---|---|---|---|
| Oxides | % | | |
| $SiO_2$ | 25.00 | 21.30 | 22.16 |
| $Al_2O_3$ | — | 4.75 | 4.94 |
| $TiO_2$ | — | 0.38 | 0.04 |
| MnO | — | 0.07 | 0.01 |
| $Fe_2O_3$ | — | 1.96 | 0.45 |
| CaO | 58.34 | 53.20 | 55.34 |
| MgO | — | 2.23 | 0.77 |
| $K_2O$ | — | 0.19 | 0.22 |
| $Na_2O$ | — | 0.04 | 0.02 |
| $SO_3$ | 16.66 | 15.44 | 16.06 |
| $P_2O_5$ | — | 0.44 | 0.01 |

TABLE 4-continued

Chemical and mineralogical composition of the clinkers

| | $T_{pur}$ | $TK_{FA}$ | $TK_{AGS}$ |
|---|---|---|---|
| | % by weight | | |
| Phases | | | |
| Anhydrite | 0.4 | 0.3 | 0.2 |
| $C_3A$ (cub) | — | 2.2 | — |
| $C_3A$ (orth) | — | 1.2 | 0.4 |
| $C_2S$ $a'_H$ | — | 2.7 | 1.4 |
| $C_2S$ beta | — | 5.7 | 3.2 |
| $C_2S$ gamma | — | 1.1 | 0.4 |
| $\Sigma C_2S$ | — | 9.5 | 5.0 |
| Ternesite | 99.2 | 74.9 | 85.5 |
| Free lime | <0.1 | 0.3 | 0.3 |
| Periclase | — | 1.2 | 0.5 |
| $C_4A_3S$ | — | 9.3 | 7.0 |
| Augite | — | 1.2 | 1.1 |
| Quartz | 0.4 | — | — |
| Ratios | | | |
| $CaO/Al_2O_3$ | — | 11.21 | 11.21 |
| $Al_2O_3/Fe_2O_3$ | — | 2.42 | 10.92 |
| $SO_3/(Al_2O_3 + Fe_2O_3)$ | — | 2.30 | 2.98 |
| $SO_3/SiO_2$ | 0.67 | 0.72 | 0.72 |
| $CaO/SO_3$ | 3.50 | 3.45 | 3.45 |
| $CaO/SiO_2$ | 2.33 | 2.50 | 2.50 |
| $MgO/SiO_2$ | 0.00 | 0.10 | 0.03 |

Example 4

Figure 2:
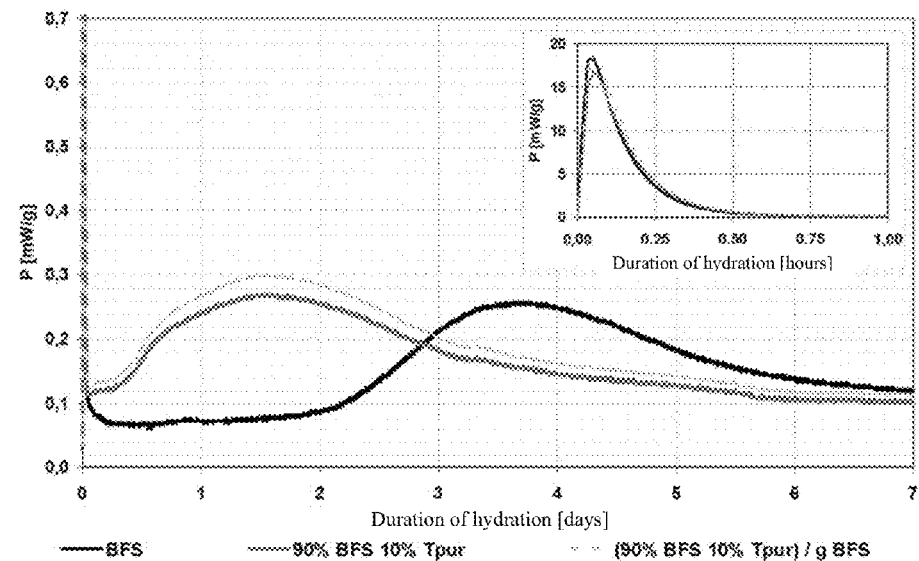
FIG. 2 shows the heat flow during hydration of ground granulated blast furnace slag and of a mixture from it with the ternesite clinker from example 1.
Figure 3:
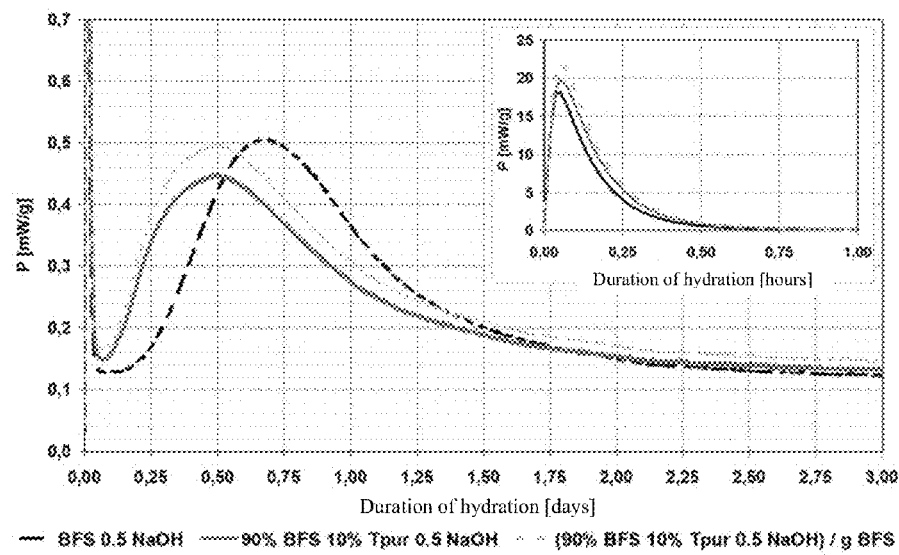
FIG. 3 shows the heat flow during hydration of mixtures from ground granulated blast furnace slag with NaOH and with NaOH and the ternesite clinker from example 1.
Figure 3:
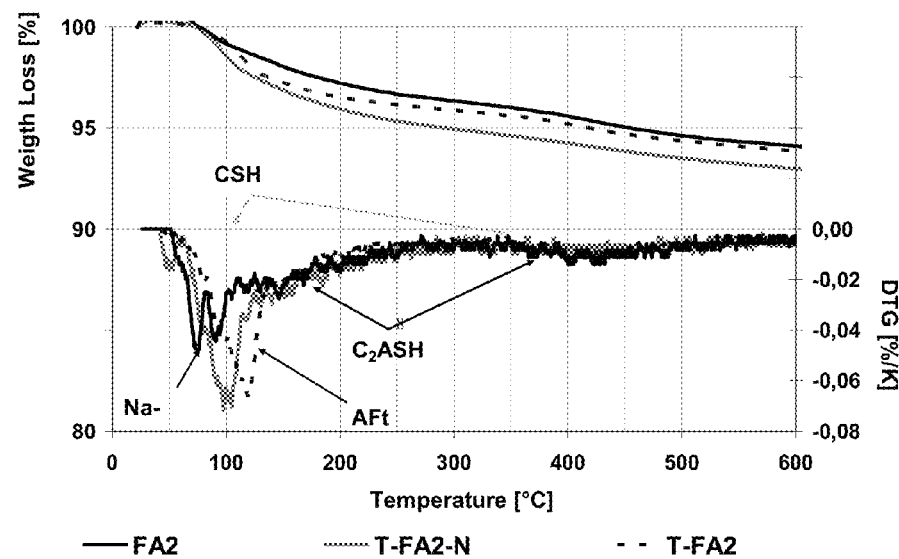

Mixtures of ground granulated blast furnace slag (BFS), ternesite ($T_{pur}$) from example 1 were prepared with and without the addition of 0.5 parts NaOH per 100 parts mixture as indicated in table 5. The measurement of the course of hydration carried out on pastes with a W/B=0.50 using an isothermal differential calorimeter (TAM air) for 7 days is depicted in FIGS. 2 and 3. In the pastes containing $T_{pur}$, there is a distinct shift of the heat development toward earlier times as compared to pure BFS.

TABLE 5

Mixtures BFS, $T_{pur}$ and NaOH

| Mixture | BFS [%] | $T_{pur}$ | Parts NaOH/100 parts mixture |
|---|---|---|---|
| BFS | 100 | | |
| BFS 0.5NaOH | 100 | | 0.5 |
| BFS $T_{pur}$ | 90 | 10 | |
| BFS $T_{pur}$ 0.5NaOH | 90 | 10 | 0.5 |

Example 5

$T_{pur}$ was mixed in different ratios with metakaolin (MK), fly ash (FA2 or FA3) and Al(OH)3-amorphous (Geloxal, Sika). The reference samples used were mixtures of pure $T_{pur}$, metakaolin (MK) and fly ash, and mixtures of Portlandite (Merck, analytically pure) with metakaolin (MK) or fly ash. The mixtures were combined with distilled water to create pastes with W/B=0.5 and were stored in air-tight plastic bags at 20° C. The compositions of the mixtures are presented in table 6. Selected thermogravimetric measurements are presented in FIGS. 4 to 7.

It was shown that the pure starting materials did not undergo any appreciable solidification of the pastes after having been mixed with water, over the entire period of time that was recorded. A few pastes that were prepared using Portlandite exhibited slight to distinct solidification after a period between 7 and 28 days. In contrast, pastes that were prepared with $T_{pur}$ according to the invention exhibited distinct solidification followed by hardening, in part even within 2-6 hours. Mixtures of MK and $T_{pur}$ exhibited very high strength development after just 1 day. The results of these trials are summarized in table 7. One or more "+" indicate the solidification and increasing strength classes of the pastes, wherein "+++" stands for a very high strength. In comparative mortar and compressive strength trials, "+++" correlated with a strength between 2 and 10 MPa. An "−" indicates that no perceptible solidification occurred.

TABLE 6

| Mixture | Tpur | FA2 | FA3 | MK % | Geloxal | Ca(OH)$_2$ | Parts NaOH/100 parts mixture |
|---|---|---|---|---|---|---|---|
| T | 100 | | | | | | |
| FA2 | | 100 | | | | | 0.5 |
| FA3 | | | 100 | | | | 0.5 |
| MK | | | | 100 | | | |
| G | | | | | 100 | | |
| T-P | 70 | | | | | 30 | |
| FA2-P | | 70 | | | | 30 | |
| FA3-P | | | 70 | | | 30 | |
| MK-P | | | | 70 | | 30 | |
| G-P | | | | | 70 | 30 | |
| T-FA2 | 70 | 30 | | | | | |
| T-FA2-N | 70 | 30 | | | | | 0.5 |
| T-FA3 | 70 | | 30 | | | | 0.5 |
| T-MK | 70 | | | 30 | | | |
| T-G2 | 80 | | | | 20 | | |
| T-G3 | 70 | | | | 30 | | |

TABLE 7

| | Time | | | | | | | |
|---|---|---|---|---|---|---|---|---|
| Mixture | 1 h | 2 h | 4 h | 6 h | 1 d | 2 d | 7 d | 28 d |
| T- | − | − | − | − | − | − | − | − |
| FA2 | − | − | − | − | −/+ | −/+ | −/+ | + |
| FA3 | − | − | − | − | − | − | −/+ | −/+ |
| MK | − | − | − | − | − | − | − | − |
| G | − | − | − | − | − | − | − | − |
| T-P | − | − | − | − | − | − | − | − |
| FA2-P | − | − | − | −/+ | −/+ | −/+ | + | ++ |
| FA3-P | − | − | − | −/+ | −/+ | −/+ | −/+ | −/+ |
| MK-P | − | − | − | − | −/+ | + | ++ | +++ |
| G-P | − | − | − | − | −/+ | −/+ | + | + |
| T-FA2 | − | −/+ | −/+ | −/+ | + | + | ++ | +++ |
| T-FA2-N | −/+ | −/+ | + | + | + | ++ | ++ | +++ |
| T-FA3 | − | − | − | −/+ | −/+ | + | + | ++ |
| T-MK | + | + | ++ | ++ | +++ | +++ | +++ | +++ |
| T-G2 | + | + | ++ | ++ | ++ | +++ | +++ | +++ |
| T-G3 | + | ++ | ++ | ++ | +++ | +++ | +++ | +++ |

Example 6

$T_{pur}$ was mixed with ground granulated blast furnace slag (BFS), +/− Portland cement (OPC) (CEMI 42.5, Werk Leimen, HeidelbergCement AG, DE) in various ratios to form a binder (see table 8). The mixture of the binders with a quartz sand (ISS1 [industrial steel grit], fraction between 0.5 and 1 mm) in a ratio of 1 to 2 and a W/B=0.4 yielded the mortar to be tested, from which small prisms (2*2*2 cm) were produced. Table 8 also presents the compressive strength developments after 2, 7 and 28 days (each value is the the mean of 3 measurements). Additional mortar prisms, produced exclusively from OPC and quartz sand (W/B=0.5), are used as the reference and starting point for comparing the measurement results with standard mortar according to EN 197-1.

TABLE 8

| Mixture | Tpur % | BFS % | OPC | Binder:ISS1 | W/B | Compressive strength [MPa] | | |
|---|---|---|---|---|---|---|---|---|
| | | | | | | 2 d | 7 d | 28 d |
| 1 | | 100 | | 1:2 | 0.4 | 0 | 1 | 9 |
| 2 | 10 | 90 | | | | 2 | 5 | 17 |
| 3 | 20 | 80 | | | | 4 | 8 | 21 |
| 4 | 40 | 60 | | | | 6 | 7 | 15 |
| 5 | 15 | 80 | 5 | | | 4 | 17 | 35 |
| 6 | 35 | 60 | 5 | | | 4 | 15 | 28 |
| 7 | | 95 | 5 | | | 1 | 15 | |
| 8 | | | 100 | | 0.5 | 19 | — | 45 |
| 9 | | | 100 | 1:1 | | 21 | — | 70 |

It was found that ternesite is capable of activating a latently hydraulic material such as ground granulated blast furnace slag to react. Mixtures of ground granulated blast furnace slag and ternesite exhibited strength development that was significantly elevated even beyond the examination period.

Moreover, it was found that adding OPC to binders made of ground granulated blast furnace slag and ternesite positively influences strength development. The strength development of binders made of OPC and ground granulated blast furnace slag is slower compared to samples containing ternesite.

The invention claimed is:

1. A hydraulic binder comprising at least one latently hydraulic material and/or at least one pozzolanic material, wherein ternesite is included as an activator.

2. The binder according to claim 1, wherein relative to the total binder, 5 to 95% by weight of ternesite and 95 to 5% by weight of latently hydraulic and/or pozzolanic material is included, wherein portions of these in combination with those of remaining binder components add up to 100%.

3. The binder according to claim 1, wherein at least one latently hydraulic material selected from the group consisting of ground granulated blast furnace slag, lime-rich fly ash, latently hydraulic trass, latently hydraulic grog, latently hydraulic tempered clay, latently hydraulic artificial glasses and mixtures thereof is included.

4. The binder according to claim 1, wherein at least one pozzolanic material selected from the group consisting of pozzolanic trass, pozzolanic grog, lime-poor fly ash, shale, pozzolanic artificial glass and mixtures thereof is included.

5. The binder according to claim 1, wherein a hydraulic material selected from the group consisting of Portland cement, ground Portland cement clinker, calcium aluminate cement, geopolymer cement, calcium sulfoaluminate cement and mixtures thereof is included.

6. The binder according to claim 5, wherein 1 to 70% by weight of hydraulic material, 5 to 90% by weight of ternesite and 9 to 94% by weight of latently hydraulic and/or pozzolanic material is included, wherein portions of these in combination with those of remaining binder components add up to 100%.

7. The binder according to claim 1, wherein admixtures and/or additives are included.

8. The binder according to claim 7, wherein the binder contains, as additives, non-hydraulically reactive materials in a range of 1 to 30% by weight.

9. The binder according to claim 7, wherein the binder contains, as admixture, one or more setting and/or hardening accelerators, in a quantity in the range of 0.01 to 15% by weight.

10. The binder according to claim 1, wherein the binder contains, as admixture, lithium salts and lithium hydroxides and/or other alkali salts and alkali hydroxides and alkali silicates.

11. The binder according to claim 1, wherein a ternesite clinker is used as ternesite that is obtained by sintering a raw meal mixture containing at least sources for CaO, $SiO_2$ and $SO_3$ at 900 to 1300° C. and contains the following components relative to the total quantity of ternesite clinker:
$C_5S_2\$$ 10 to 100% by weight,
($\alpha$, $\beta$) $C_2S$ 0 to 90% by weight,
$C_4(A_xF_{(1-x)})_3\$$ 0 to 30% by weight,
$C_2(A_yF_{(1-y)})$ 0 to 30% by weight,
reactive aluminates 0 to 20% by weight,
periclase (M) 0 to 25% by weight,
secondary phases 0 to 30% by weight,
wherein the portions add up to 100%.

12. The binder according to claim 2, wherein relative to the total binder, 15 to 70% by weight of ternesite and 30 to 85% by weight of latently hydraulic and/or pozzolanic material is included, wherein portions of these in combination with those of remaining binder components add up to 100%.

13. The binder according to claim 12, wherein relative to the total binder, 20 to 60% by weight of ternesite and 40 to 80% by weight of latently hydraulic and/or pozzolanic material is included, wherein portions of these in combination with those of remaining binder components add up to 100%.

14. The binder according to claim 8, wherein the non-hydraulically reactive material is selected from the group consisting of ground limestone/dolomite, precipitated $CaCO_3$, $Ca(OH)_2$, $Mg(OH)_2$, silica fume and glass powder, contained in a range of 5 to 20% by weight.

15. The binder according to claim 9, wherein the one or more setting and/or hardening accelerators are selected from the group consisting of components having available aluminum, which release aluminum upon contact with water, reactive and amorphous aluminum hydroxide, contained in a quantity in the range of 0.5 to 8% by weight.

16. The binder according to claim 15, wherein the component having available aluminum is selected from the group consisting of soluble alkali-/alkaline earth aluminates and aluminum salts.

17. The binder according to claim 16, wherein the component having available aluminum is selected from the group consisting of $Na_2Al_2O_4$, $K_2Al_2O_4$, aluminum nitrate, aluminum acetate, aluminum chloride, aluminum formiate, and aluminum sulphate.

18. The binder according to claim 10, wherein the admixture is selected from the group consisting of alkali salts, alkali silicates and alkali hydroxides, which increase a pH value of a solution and a reactivity of the $C_5S_2\$$.

19. The binder according to claim 11, wherein the ternesite clinker contains the following components relative to the total quantity of ternesite clinker:
$C_5S_2\$$ 40 to 90% by weight
($\alpha$, $\beta$) $C_2S$ 10 to 60% by weight
$C_4(A_xF_{(1-x)})_3\$$ 5 to 20% by weight
$C_2(A_yF_{(1-y)})$ 8 to 15% by weight
reactive aluminates 3 to 10% by weight
periclase (M) 2 to 10% by weight
secondary phases 5 to 10% by weight,
wherein the portions add up to 100%.

20. The binder according to claim 19, wherein, relative to the total binder, 20 to 60% by weight of ternesite is added.

21. A method of producing concrete, mortar or plaster, comprising:
combining the binder according to claim 1 with mineral aggregates to produce concrete, mortar or plaster, wherein a water/binder value of 0.2 to 2 is set.

22. A method for immobilizing pollutants or producing as a sealing wall mass, comprising:
adding to the binder according to claim 1 adsorptive additions selected from the group consisting of zeolites and ion-exchange resins.

23. A method for activating latently hydraulic and/or pozzolanic material in hydraulic binders, comprising:
adding ternesite as an activator to the latently hydraulic and/or pozzolanic material.

24. The method according to claim 23, wherein, relative to the total binder, 5 to 95% by weight of ternesite is added.

25. The method according to claim 24, wherein, relative to the total binder, 15 to 70% by weight of ternesite is added.

26. The method according to claim 24, wherein at least one alkali- and/or alkaline-earth hydroxide is added as additional activator.

27. The method according to claim 24, wherein 1 to 70% by weight of hydraulic material, 5 to 90% by weight of ternesite and 9 to 94% by weight of latently hydraulic and/or pozzolanic material is included, wherein portions of these in combination with those of remaining binder components add up to 100%.

* * * * *